Sept. 19, 1950      F. R. H. LAURANT      2,522,622
ELECTROMAGNETICALLY CONTROLLED FRICTION CLUTCH
Filed Jan. 6, 1949      2 Sheets-Sheet 1

Inventor
Fernand Robert-Henri Laurant
By Flocks and Simon
Attorneys

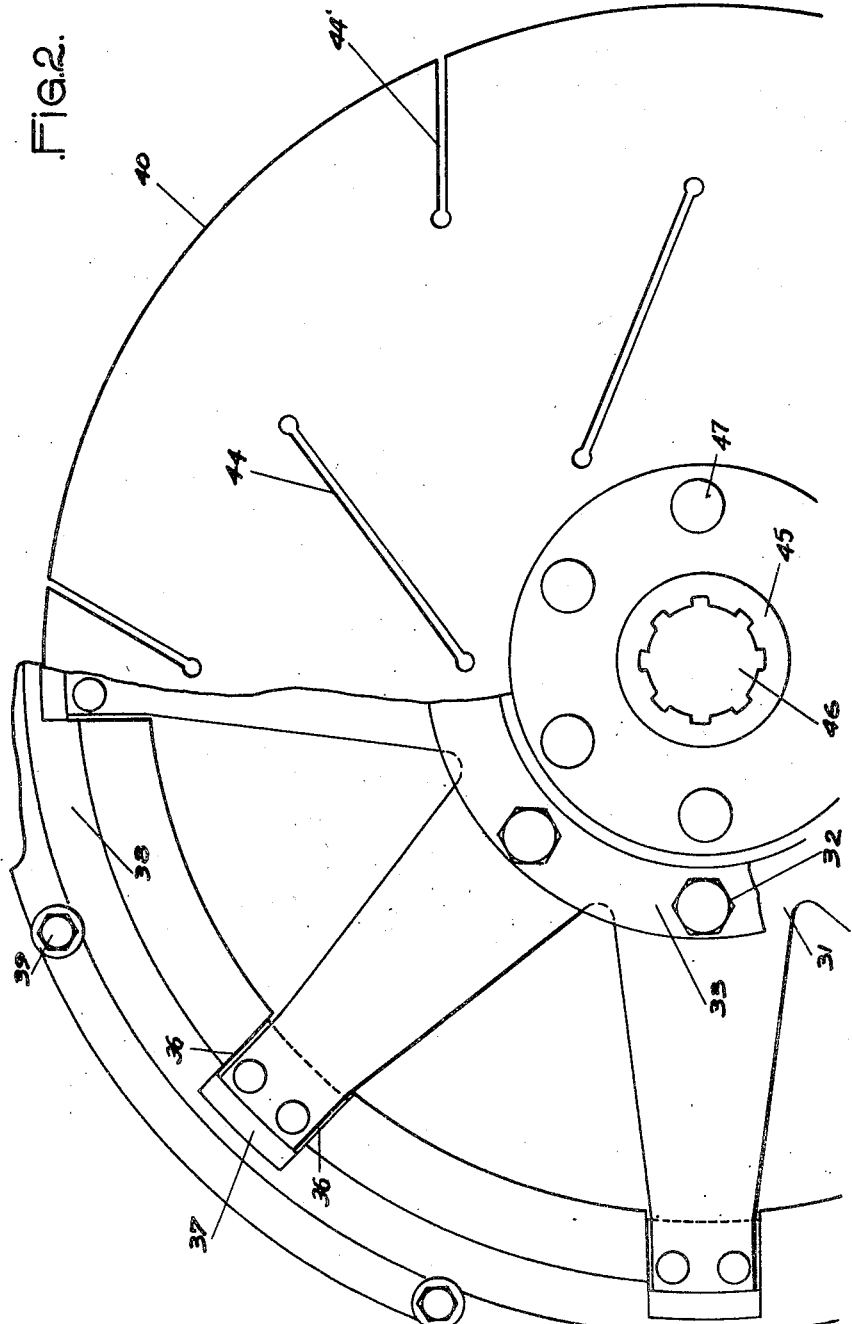

Patented Sept. 19, 1950

2,522,622

UNITED STATES PATENT OFFICE 2,522,622

ELECTROMAGNETICALLY CONTROLLED FRICTION CLUTCH

Fernand Robert Henri Laurant, Paris, France, assignor to Etablissements Alba, Asnieres, Seine, France, a joint-stock company of the Republic of France Application January 6, 1949, Serial No. 69,508
In France February 14, 1948

2 Claims. (Cl. 192—84)

The present invention relates to improvements in electromagnetically controlled friction clutches and can be applied to any clutch which comprises a disc of magnetic metal keyed on a shaft, preferably the driven shaft, said disc being interposed between a plate secured to another shaft, preferably the driving shaft, and a movable counter-plate which is secured to said plate as regards angular movement, but which can move axially, said plate and said counter-plate being made of magnetic metal. In one of these two members, and preferably in the plate, is mounted a coil in such a manner that the magnetic flux produced when a current is flowing through the coil causes a relative axial movement of the counter-plate towards the plate, so that the disc is pressed between said two members. The excitation coil is mounted on the plate, at the centre of the attracting magnetic field, so that the lines of force pass through the disc on either side of said coil.

The heretofore known clutches of this type have a serious drawback which consists in the fact that when the clutch is being disengaged, remanence effects occur which prevent a positive and clean disengagement from being obtained.

The present invention overcomes this drawback and covers an electromagnetically controlled clutch which is essentially characterised by the insertion, under segments of magnetic metal mounted on either side of the friction surfaces, both on the plate side and on the counter-plate side, of sheets of non-magnetic foil which produce gaps in the magnetic circuit and thereby enable the remanence effect, which impairs the positive disengagement of the whole device, to be eliminated. The disc itself, in an advantageous embodiment, comprises a disc of non-magnetic foil enclosed between two thin cheeks of magnetic metal that form the essential portion of the disc, which is preferably the driven disc. This thin disc has the advantage of a minimum inertia compatible with the facility in effecting a change of speed.

Other advantages and features of the present invention will become apparent from the ensuing description made with reference to the accompanying drawings which show diagrammatically and merely by way of example, one embodiment of an electromagnetic clutch according to the invention.

In said drawings:

Fig. 2 is a view of the flexible star-shaped connecting disc that acts as an angular connection between the counter-plate and the plate, with a portion broken away to show part of the driven disc.

Figure 1:
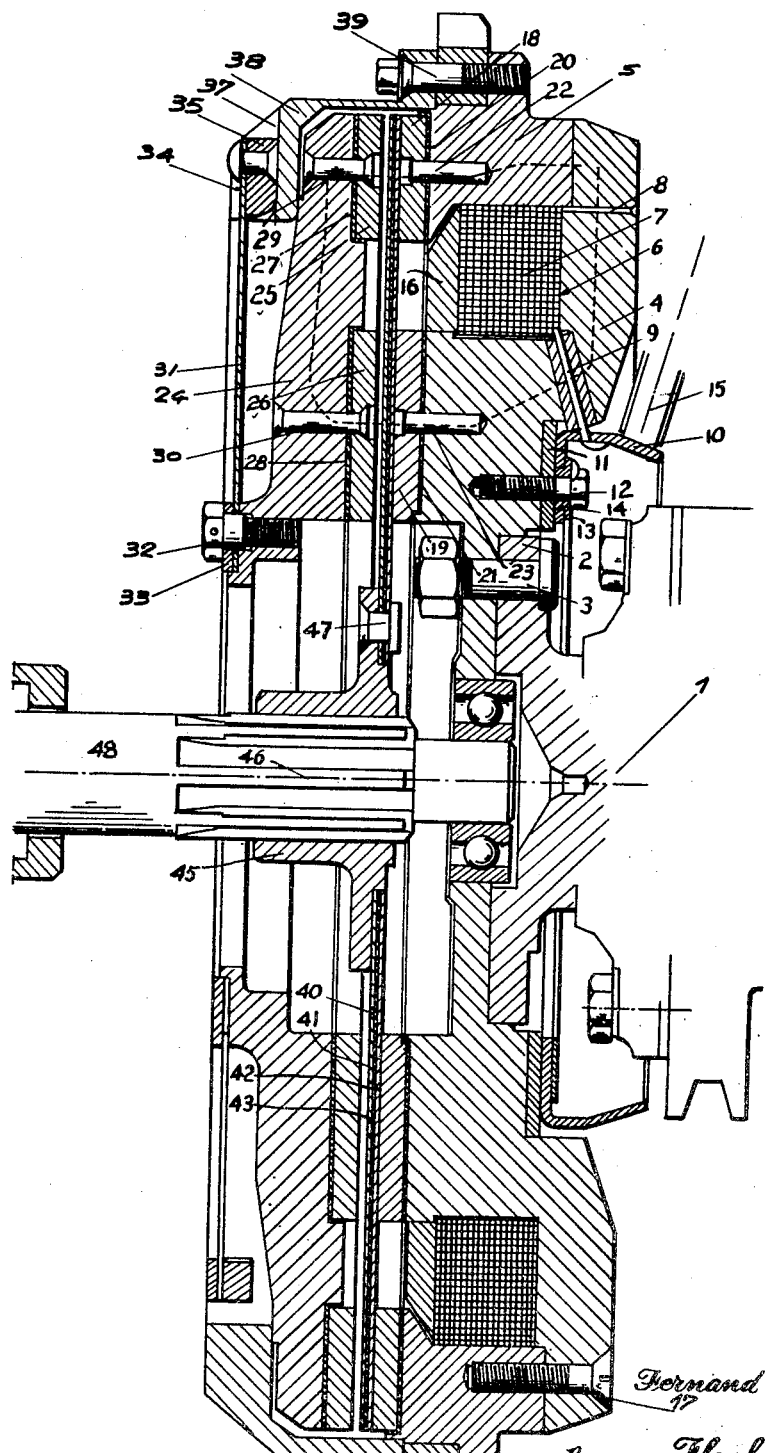
Fig. 1 is an axial section of an electromagnetically controlled friction clutch as improved according to the invention.

In the embodiment shown by way of example, a plate comprising two parts of magnetic metal, viz. a body 4 and a ring 5, is fixed by means of bolts 3 on the end of a driving or actuating shaft 1 provided with a flange 2. Said plate is provided on one side face with a circular cavity 6 in which is mounted a suitably insulated electric coil 7, said coil forming the winding of the electromagnet adapted to actuate the clutch. One of the ends of said winding is, for example, grounded at 8 in the body of the plate 4, whereas the other end 9 is connected to a current supply collector 10 which is insulated from the body of the plate 4 by an insulating plate 11. Said collector 10 is fixed by means of screws 12 which are screwed in the plate body 4 and are insulated by an insulating plate 13 and insulating washers 14. The supply of current is effected by a current supply brush 15. A cheek 16 of non-magnetic material is sweated, for example, on the plate body 4, enabling the winding to be effected on said plate body 4. The ring 5 is assembled by means of screws 17 and completes said plate.

On the open faces of the U formed by the plate body 4 and its ring 5 are mounted discs 18 and 19 of special cast-iron, the characteristics of which are calculated to produce a suitable friction. Under said discs 18 and 19 are interposed sheets of foil 20 and 21 of non-magnetic metal, of brass for example, and this whole system of discs is fixed by means of rivets or studs 22 and 23 which are seated on the portions 4 and 5 that form the plate.

Opposite said plate is mounted a counter-plate 24 likewise comprising discs 25 and 26 of the same special cast-iron under which are interposed sheets of foil 27 and 28 of non-magnetic metal, said discs 25 and 26 being assembled to the counter-plate by means of rivets 29 and 30. On said counter-plate 24 is fixed a flexible star-shaped disc 31. The hub of said flexible disc 31 is fixed on the counter-plate 24 by means of screws 32 and a clamping counter-plate 33. At the ends 34 of the arms of the flexible disc 31 are riveted driving dogs 35. The side faces 36 of said driving dogs are adapted to slide freely in the grooves or slots 37 provided in a ring 38 of non-magnetic metal, of aluminium for example, which is fixed by means of screws 39 to the ring 5 forming part of the plate. Between the plate and the counter-plate is placed, with an axial operating clearance, a disc 40 comprising two cheeks 41 and 42 of magnetic metal, of template steel plate for example, between which is interposed a sheet of foil 43 of non-magnetic metal. The assembly that forms this disc 40 is either riveted, or assembled by electric spot welding, by way of example.

An advantageous arrangement of the two cheeks 41 and 42 comprises an orthogonal arrangement of their fibres so as to compensate for their elastic deformation due to heating, during the period of sliding friction. A complement of this device consists in a series of notches 44 and 44' suitably arranged at the location of the friction surfaces in order also to compensate for the elastic deformations of the cheeks 41 and 42. Said disc 40 is secured to a hub 45 mounted on a secondary or driven shaft 46, provided with splines for example, by means of rivets 47.

The improved electromagnetically controlled friction clutch according to the invention operates as follows: Assuming that the driving or actuating shaft 1 is rotating, if the circuit that supplies the coil 7 is closed, a current flows through said coil which sets up a magnetic field. The path of the magnetic flux is shown in dotted lines in Fig. 1, and said magnetic flux passes through the assembly of parts comprising the plate, the disc and the counter-plate. The counter-plate 24 is attracted by the flux and moves axially towards the plate, comes into contact against the disc 40 and presses same against the plate (4 and 5). During this axial movement, the counter-plate 24 has to overcome the increasing deformation force of the flexible disc 31, which is moreover comparatively slight, and the compression of the disc causes said disc, and therefore the secondary or driven shaft 46, to be driven by friction proportionally to the value of the excitation current of the coil 7, until the instant when said excitation current reaches such a value that the flux produced is capable, proportionally to the coefficient of friction of the contacting surfaces, of reaching a value equal to the anti-torque moment compatible with the value of the driving torque, and the slipping stops and gives place to a positive drive, the speed of the driven shaft becoming equal to the speed of the driving shaft.

The part of the anti-torque moment obtained by pressing the counter-plate 24 against the disc 40 is transmitted to the plate by means of the driving dogs 35 riveted to the flexible disc 31 secured to the counter-plate 24, and of the grooves or slots 37 of the ring 38 fixed to the ring 5 of the plate. The arrangement of the driving dogs 35 is such that the arms forming the flexible disc 31 can never be subjected to torsional stress by the action of the torque.

As soon as the excitation current of the coil 7 is cut off, the flux becomes zero and the remanent magnetism being eliminated by the gaps produced by the sheets of foil of non-magnetic material, the disengagement of the counter-plate 24 is effected by the resilient retraction of the arms of the flexible disc 31, and the disengagement of the whole device takes place.

I claim:

1. An electromagnetic clutch for coupling a driving shaft and a driven shaft, comprising a magnetic flywheel keyed on the driving shaft, an induction coil mounted on said flywheel for producing the magnetic flux, a ring of magnetic metal which is adapted to rotate with the driving shaft, but is able to move axially, a disc adapted to rotate with the driven shaft and interposed between said flywheel and said ring, and rings of magnetic cast-iron fixed on the mutually facing surfaces of the flywheel and the ring, sheets of non-magnetic metal foil being interposed between said rings and said surfaces.

2. Electromagnetic clutch according to claim 1, wherein the disc is formed of a sheet of non-magnetic metal foil inserted between two thin plates of magnetic metal.

FERNAND ROBERT HENRI LAURANT.

REFERENCES CITED

The following references are of record in the file of this patent:

UNITED STATES PATENTS

| Number | Name | Date |
|---|---|---|
| 1,756,907 | Payne | Apr. 29, 1930 |